G. W. DEVIOV.
AUTOMOBILE SLEIGH.
APPLICATION FILED JAN. 26, 1909.

945,120.

Patented Jan. 4, 1910.
3 SHEETS—SHEET 3.

Fig. 3.

Fig. 6.

Witnesses
L. B. James

Inventor
George W. Deviov
By Chandler & Chandler
Attorneys

UNITED STATES PATENT OFFICE.

GEORGE W. DEVIOV, OF NORTH SPENCER, MASSACHUSETTS.

AUTOMOBILE SLEIGH.

945,120.  Specification of Letters Patent.  Patented Jan. 4, 1910.

Application filed January 26, 1909. Serial No. 474,327.

*To all whom it may concern:*

Be it known that I, GEORGE W. DEVIOV, a citizen of the United States, residing at North Spencer, in the county of Worcester, State of Massachusetts, have invented certain new and useful Improvements in Automobile Sleighs; and I do hereby declare the following to be a full, clear, and exact description of the invention, such as will enable others skilled in the art to which it appertains to make and use the same.

This invention relates to motor vehicles and has special reference to an automobile sleigh.

One object of the invention is to provide an improved form of runner for use with sleighs of this character.

Another object of the invention is to provide an improved form of rear truck adapted to be used with sleighs of this character.

A third object of the invention is to provide a novel means for attaching the improved truck to the rear axle of an automobile.

With the above and other objects in view, the invention consists, in general, of a motor vehicle provided with a novel arrangement of sleigh truck, attachment for the same, and runners therefor.

The invention further consists in certain novel details of construction and combinations of parts hereinafter fully described, illustrated in the accompanying drawings, and specifically set forth in the claims.

Figure 1:
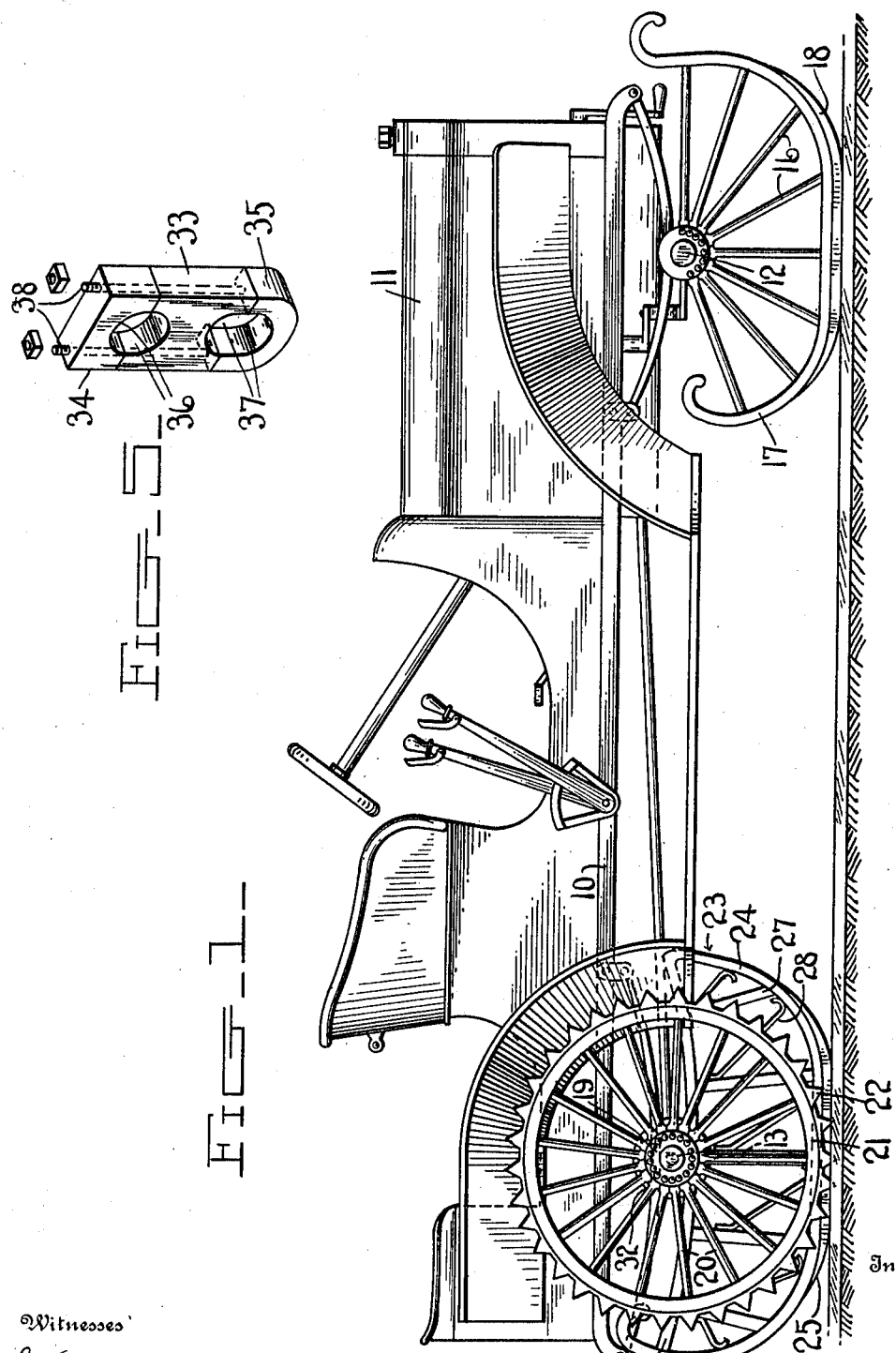
Figure 2:
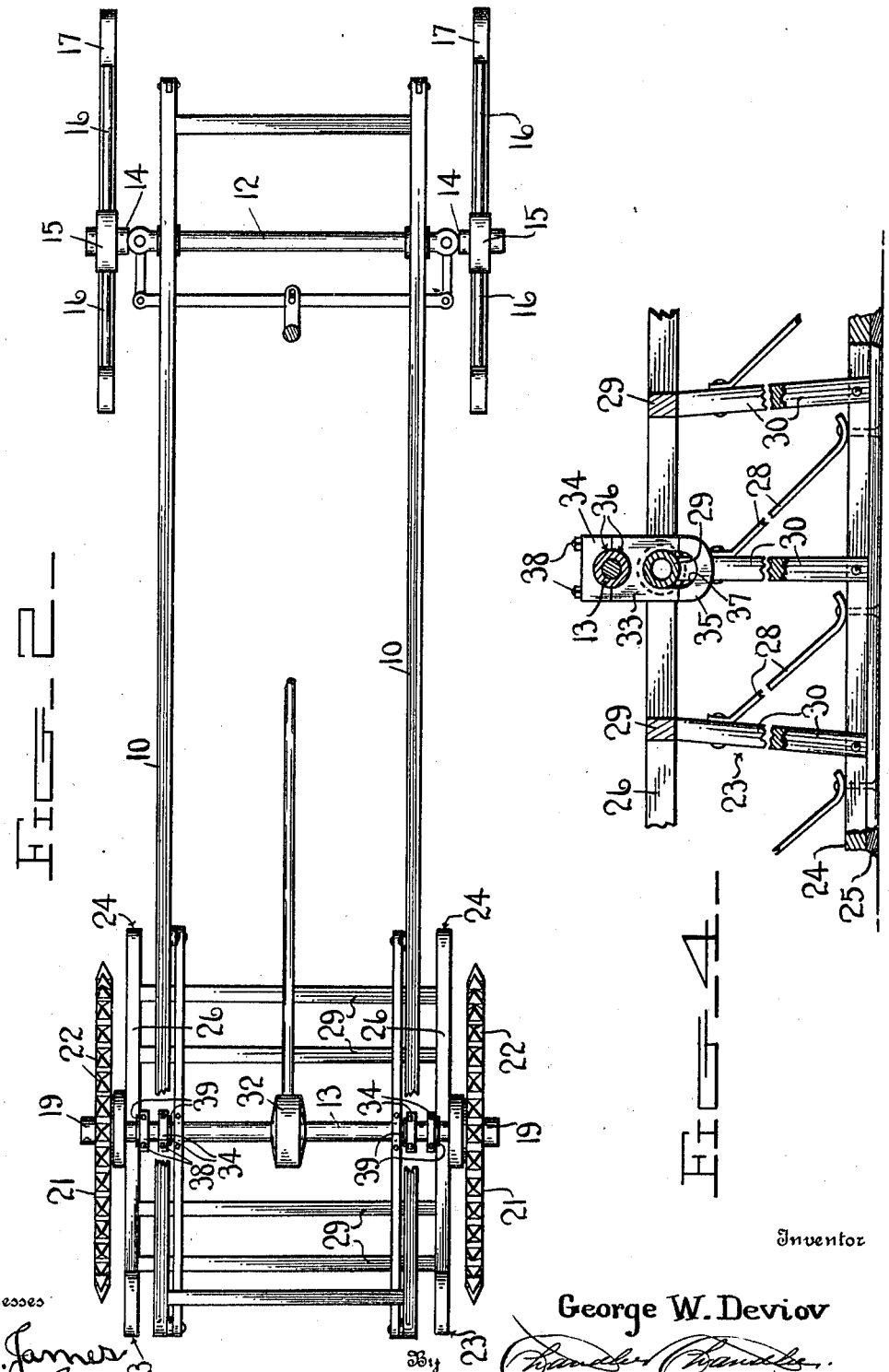

In the accompanying drawings, like characters of reference indicate like parts in the several views, and:—Figure 1 is a side elevation of an automobile constructed in accordance with this invention. Fig. 2 is a plan view of the chassis. Fig. 3 is a rear elevation of the chassis. Fig. 4 is a detail section on the line 4—4 of Fig. 3. Fig. 5 is a detail view of one of the attaching clips. Fig. 6 is a perspective view of the rear sleigh truck detached.

The numeral 10 indicates the frame of the chassis and upon this frame is supported, in the usual manner, a body 11 of any desired construction.

Mounted in the usual manner upon the chassis is a front axle 12 and a rear axle 13. The front axle 12 has pivotally mounted thereon the usual trunnions 14 whereon are mounted a pair of the improved form of sleigh runners. These sleigh runners are each provided with a hub 15 which is arranged to fit over the journal of the axle and from this hub radiate spokes 16. Carried upon the outer end of the spokes 16 is a rim 17 having a centrally disposed flattened portion and being upturned at each end. This rim 17 is provided with a shoe 18 of greater width than the runner and of trapezoidal cross section. Further, the ends of the shoe are beveled off with a gentle curve so as to merge into the curve of the rim 17. It will be noted from this construction that this runner is equally well adapted to go either forward or backward and at the same time the flattened portion allows for movement over any inequalities of the ground.

The rear axle 13 has the ordinary automobile wheels removed and in lieu thereof there is substituted a pair of wheels each provided with the usual hub 19, spokes 20 and rim 21. Around the periphery of each of these wheels is provided a series of teeth preferably of regular square pyramidal form as indicated at 22. These teeth serve as the means to engage ice or snow and drive the machine.

In order to properly support the rear end of the vehicle, there is provided a sleigh truck comprising a pair of spaced runners 23. These sleigh runners each comprise a rim member 24 and shoe 25 constructed in a manner similar to the front rims and shoes. The upper ends of each of the rims 24 are joined by a longitudinal bar 26 and struts 27 connect the bar 26 with its respective rim 24 intermediate the ends, being braced to the rims by suitable braces 28. Extending across from each of the upper ends of the struts 27 are cross bars 29 and lateral braces 30 serve to securely brace the rims to the cross bars 29. The central cross bar 29 is provided with a downwardly depressed portion as indicated at 31 in order to clear the gear case 32 of the rear axle. This central cross bar is further made circular in cross section.

Secured adjacent each end of the axle 13 are certain improved clips. These clips consist of a central portion 33, a top cap 34, and a bottom cap 35. The central portion 33 and top cap 34 are provided with opposed recesses 36 which, when the cap is in position on the central portion 33, are arranged to engage the rear axle 13 and fit tightly thereon. The body portion 33 and bottom cap 35 are provided with similar opposed recesses 37 and these recesses are of such width as to embrace the central cross bar 29 and of such length as to permit an up and down play of the cross bar in the opening formed by the recesses when the cap is in position. Extending through the members 33, 34, and 35 are suitable bolts 38 which, when tightened, serve to fixedly hold the respective clips upon the axle 13, and at the same time secure the bottom cap 35 to the central member 33.

In order to prevent lateral play of the rear sleigh truck, the central cross bar 29 is provided at each end with a pair of spaced flanges 39 adapted to lie, one upon one side and the other upon the other side, of one of the securing clips. It is preferred to employ a pair of these clips at each end of the member 30 so arranged that one of the clips lies between a strut 27 and the brace 30 while the other lies inside of the brace 30, the same arrangement being observed on each side.

It will be obvious from this arrangement that the machine can be driven either backward or forward owing to the peculiar conformation of the runners, and it will also be obvious that by reason of the rear truck and driving wheels being located upon the same axle, any tendency of the driving wheels to get into and sink in the roads will be counteracted by the weight of the machine coming on the rear truck directly in alinement with the point of contact of the wheels. By this arrangement the driving wheels are enabled to exert their full force in pushing the machine forward without using the power to dig themselves out of the ground.

It is obvious that minor changes may be made in the form and construction of the invention without departing from the material principles thereof. It is not therefore desired to confine the invention to the exact form herein shown and described, but it is wished to include all such as properly come within the scope of the appended claims.

Having thus described the invention, what is claimed as new, is:—

1. A sleigh truck for automobiles comprising a pair of spaced runners each having a rim having its ends turned upward with curves of equal radius, cross bars holding said runners in spaced relation, and clips arranged to be fixedly secured to an automobile axle and provided with elongated openings adapted to receive one of said cross bars and attach the same to the axle, the clips being arranged to permit vertical oscillation of said cross bar.

2. A sleigh truck for automobiles comprising a pair of spaced runners each having a rim having its ends turned upward with curves of equal radius, cross bars holding said runners in spaced relation, clips arranged to be fixedly secured to an automobile axle and provided with elongated openings adapted to receive one of said cross bars and attach the same to the axle, and collars on the clip supported cross bar to prevent lateral movement of the truck, the clips being arranged to permit vertical oscillation of said cross bar.

3. In combination with an automobile chassis provided with a front and rear axle, sleigh runners supported on the front axle, driving wheels provided with peripherally arranged ground engaging members mounted on the rear axle, clips each comprising a central member and top and bottom caps, said clips being arranged to closely embrace said rear axle between the central member and top cap, a sleigh truck comprising a pair of spaced runners and cross bars connecting said runners one of which is adapted to be held between the central members and bottom caps of said clips, the clips being arranged to permit vertical oscillation of said cross bar, and collars on the clip supported cross bar to prevent lateral movement of said truck, the truck being arranged to prevent the driving wheel rims sinking into the ground.

In testimony whereof, I affix my signature, in presence of two witnesses.

GEORGE W. DEVIOV.

Witnesses:
JAMES LA CROSS,
VICTOR BACHAND.